United States Patent
Pourdarvish et al.

(10) Patent No.: US 10,547,189 B2
(45) Date of Patent: Jan. 28, 2020

(54) TEMPERATURE DEPENDENT CHARGE ALGORITHM

(71) Applicant: ZPower, LLC, Camarillo, CA (US)

(72) Inventors: Reza Pourdarvish, Camarillo, CA (US); Timothy W. Powers, Thousand Oaks, CA (US); Troy W. Renken, Alpharetta, GA (US)

(73) Assignee: ZPower, LLC, Camarillo, CA (US)

( * ) Notice: Subject to any disclaimer, the term of this patent is extended or adjusted under 35 U.S.C. 154(b) by 14 days.

(21) Appl. No.: 15/566,764

(22) PCT Filed: Apr. 27, 2016

(86) PCT No.: PCT/US2016/029414
§ 371 (c)(1),
(2) Date: Oct. 16, 2017

(87) PCT Pub. No.: WO2016/176236
PCT Pub. Date: Nov. 3, 2016

(65) Prior Publication Data
US 2018/0123369 A1 May 3, 2018

Related U.S. Application Data

(60) Provisional application No. 62/154,206, filed on Apr. 29, 2015.

(51) Int. Cl.
*H02J 7/00* (2006.01)
*H01M 10/44* (2006.01)

(52) U.S. Cl.
CPC ........... *H02J 7/0052* (2013.01); *H01M 10/44* (2013.01); *H02J 7/007* (2013.01); *H02J 7/0086* (2013.01); *H02J 7/0091* (2013.01)

(58) Field of Classification Search
CPC ........ H01M 10/44; H02J 7/0052; H02J 7/007; H02J 7/0086; H02J 7/0091; H02J 7/00
See application file for complete search history.

(56) References Cited

U.S. PATENT DOCUMENTS

| 3,708,738 A | 1/1973 | Crawford et al. |
| 4,288,733 A | 9/1981 | Bilanceri et al. |

(Continued)

FOREIGN PATENT DOCUMENTS

| EP | 0323539 | 7/1989 |
| EP | 1076397 | 2/2001 |

(Continued)

OTHER PUBLICATIONS

International Search Report for PCT/US2016/029414 dated Jul. 12, 2016.

(Continued)

*Primary Examiner* — Vuthe Siek
(74) *Attorney, Agent, or Firm* — Honigman LLP; Andrew N. Weber; Jonathan P. O'Brien

(57) ABSTRACT

A method (600, 700, 800) for charging a battery (102) comprises obtaining, by charging circuitry (120), an open circuitry voltage of the battery prior to a charging session. The charging circuitry is in electrical communication with a power source (110) and the battery. The method also comprises initiating the charging session to charge the battery at a constant charge current-constant charge voltage with power provided from the power source and obtaining an ambient temperature (T) measured by a temperature sensor (160) in communication with the charging circuitry. The method also comprises obtaining a charge termination time ($t_r$) based on the ambient temperature and terminating the charging session when the charge termination time is reached.

26 Claims, 8 Drawing Sheets

(56) References Cited

U.S. PATENT DOCUMENTS

| | | |
|---|---|---|
| 4,313,078 A | 1/1982 | Bilsky et al. |
| 4,388,582 A | 6/1983 | Saar et al. |
| 4,390,828 A | 6/1983 | Converse et al. |
| 4,392,101 A | 7/1983 | Saar et al. |
| 4,609,816 A | 9/1986 | Severin |
| 4,609,861 A | 9/1986 | Inaniwa et al. |
| 4,719,401 A | 1/1988 | Altmejd |
| 4,745,349 A | 5/1988 | Palanisamy et al. |
| 5,049,803 A | 9/1991 | Palanisamy |
| 5,089,765 A | 2/1992 | Yamaguchi |
| 5,160,880 A | 11/1992 | Palanisamy |
| 5,166,596 A | 11/1992 | Goedken |
| 5,204,611 A | 4/1993 | Nor et al. |
| 5,229,706 A | 7/1993 | Fijiwara |
| 5,235,232 A | 8/1993 | Conley et al. |
| 5,248,928 A | 9/1993 | Gilmore |
| 5,254,931 A | 10/1993 | Martensson |
| 5,270,635 A | 12/1993 | Hoffman et al. |
| 5,307,000 A | 4/1994 | Podrazhansky et al. |
| 5,356,732 A | 10/1994 | Terasaka et al. |
| 5,387,857 A | 2/1995 | Honda et al. |
| 5,396,163 A | 3/1995 | Nor et al. |
| 5,408,173 A | 4/1995 | Knapp |
| 5,438,250 A | 8/1995 | Retzlaff |
| 5,508,598 A | 4/1996 | Al-Abassy |
| 5,514,947 A | 5/1996 | Berg |
| 5,621,306 A | 4/1997 | Ise |
| 5,642,031 A | 6/1997 | Brotto |
| 5,721,688 A | 2/1998 | Bramwell |
| 5,747,964 A | 5/1998 | Turnbull |
| 5,795,679 A | 8/1998 | Kawakami et al. |
| 5,796,238 A | 8/1998 | Hiratsuka et al. |
| 5,889,385 A | 3/1999 | Podrazhansky et al. |
| 5,896,024 A | 4/1999 | Bradus et al. |
| 5,982,144 A | 11/1999 | Johnson et al. |
| 5,982,151 A | 11/1999 | Nagai et al. |
| 5,994,878 A | 11/1999 | Ostergaard et al. |
| 6,025,696 A | 2/2000 | Lenhart et al. |
| 6,037,750 A | 3/2000 | Von Novak |
| 6,037,751 A | 3/2000 | Klang |
| 6,078,251 A | 6/2000 | Landt |
| 6,091,229 A | 7/2000 | Oglesbee et al. |
| 6,094,034 A | 7/2000 | Matsuura |
| 6,097,172 A | 8/2000 | Podrazhansky et al. |
| 6,104,167 A | 8/2000 | Bertness et al. |
| 6,124,700 A | 9/2000 | Nagai et al. |
| 6,137,268 A | 10/2000 | Mitchell et al. |
| 6,157,552 A | 12/2000 | Kern et al. |
| 6,215,291 B1 | 4/2001 | Mercer |
| 6,215,312 B1 | 4/2001 | Hoenig |
| 6,218,806 B1 | 4/2001 | Brotto et al. |
| 6,218,819 B1 | 4/2001 | Tiwari |
| 6,222,343 B1 | 4/2001 | Crisp et al. |
| 6,232,750 B1 | 5/2001 | Podrazhansky et al. |
| 6,252,373 B1 | 6/2001 | Stefansson et al. |
| 6,342,774 B1 | 1/2002 | Kreisinger et al. |
| 6,459,243 B1 | 10/2002 | Cheiky et al. |
| 6,476,585 B1 | 11/2002 | Simmonds |
| 6,522,102 B1 | 2/2003 | Cheiky et al. |
| 6,743,548 B2 | 6/2004 | Cheiky et al. |
| 6,865,690 B2 | 3/2005 | Kocin |
| 6,943,529 B2 | 9/2005 | Cheiky et al. |
| 6,943,530 B2 | 9/2005 | Cheiky |
| 7,218,076 B2 | 5/2007 | Cheiky et al. |
| 9,240,696 B2 | 1/2016 | Renken et al. |
| 10,291,051 B2 | 5/2019 | Pourdarvish et al. |
| 2001/0011883 A1 | 8/2001 | Sonobe |
| 2002/0199131 A1 | 12/2002 | Kocin |
| 2003/0111979 A1 | 6/2003 | Cheiky et al. |
| 2004/0178772 A1 | 9/2004 | Cheiky et al. |
| 2004/0217738 A1 | 11/2004 | Cheiky et al. |
| 2006/0216596 A1 | 9/2006 | Cheiky |
| 2008/0024089 A1* | 1/2008 | Meng ............... H02J 7/0091 320/128 |
| 2009/0189572 A1 | 6/2009 | Kamatani |
| 2009/0218990 A1 | 9/2009 | Johnson et al. |
| 2010/0194351 A1* | 8/2010 | Nagashima ......... H01M 10/052 320/152 |
| 2011/0175571 A1 | 7/2011 | Renken et al. |
| 2012/0013175 A1* | 1/2012 | Newman, Jr. ......... B60R 16/033 307/9.1 |
| 2012/0268059 A1 | 10/2012 | Nishikawa et al. |
| 2012/0306455 A1 | 12/2012 | Fischbach et al. |
| 2013/0033235 A1 | 2/2013 | Fukaya |
| 2013/0207618 A1* | 8/2013 | Renken ............... H01M 10/425 320/155 |
| 2014/0031840 A1 | 1/2014 | Mashiach |
| 2014/0225622 A1 | 8/2014 | Kudo et al. |
| 2015/0035480 A1 | 2/2015 | Shichino |
| 2015/0188326 A1 | 7/2015 | Choi et al. |
| 2015/0215865 A1* | 7/2015 | Solum ................... H04R 25/30 370/311 |
| 2015/0357859 A1 | 12/2015 | Pourdarvish et al. |
| 2015/0372495 A1 | 12/2015 | McCauley et al. |
| 2017/0211875 A1 | 7/2017 | Lee et al. |

FOREIGN PATENT DOCUMENTS

| | | |
|---|---|---|
| FR | 2683093 | 4/1993 |
| GB | 892954 | 4/1962 |
| GB | 2178608 | 2/1987 |
| JP | 2000-14035 | 1/2000 |
| JP | 2002-305038 | 10/2002 |
| TW | 542915 | 7/2003 |
| TW | 200822484 | 5/2008 |
| TW | 201018046 | 5/2010 |
| WO | 1995/012916 | 5/1995 |
| WO | 1999/017418 | 4/1999 |
| WO | 2000/014848 | 3/2000 |
| WO | 2001/047086 | 6/2001 |
| WO | 2003/052859 | 6/2003 |
| WO | 2003/052899 | 6/2003 |
| WO | 2003/061052 | 7/2003 |
| WO | 2006/075740 | 7/2006 |
| WO | 2008/117218 | 10/2008 |
| WO | 2009/051843 | 4/2009 |
| WO | 2012/009652 | 1/2012 |
| WO | 2014/110477 | 7/2014 |
| WO | 2016/204734 | 12/2016 |
| WO | 2018/226571 | 12/2018 |
| WO | 2019/051022 | 3/2019 |
| WO | 2019/051026 | 3/2019 |

OTHER PUBLICATIONS

International Preliminary Report on Patentability for PCT/US2002/038934 dated Jun. 21, 2004.
International Preliminary Report on Patentability for PCT/US2002/039153 dated May 16, 2003.
International Preliminary Report on Patentability for PCT/US2002/039154 dated May 16, 2003.
International Preliminary Report on Patentability for PCT/US2008/011950 dated Apr. 20, 2010.
International Preliminary Report on Patentability for PCT/US2011/044212 dated Jan. 24, 2013.
International Preliminary Report on Patentability for PCT/US2014/011214 dated Jul. 23, 2015.
International Search Report for PCT/US2002/038934 dated May 14, 2003.
International Search Report for PCT/US2002/039153 dated Apr. 10, 2003.
International Search Report for PCT/US2002/039154 dated Apr. 10, 2003.
International Search Report for PCT/US2008/011950 dated Nov. 2, 2009.
International Search Report for PCT/US2011/044212 dated Aug. 7, 2012.
International Search Report for PCT/US2014/011214 dated Feb. 6, 2015.

(56) References Cited

OTHER PUBLICATIONS

Singh, Harmohan et al., "Advanced State of Charge Measurement Technique for Silver-Zinc Batteries", The Fifteenth Annual Battery Conference on Applications and Advances, Long Beach, CA, USA, Jan. 11-14, 2000, pp. 157-163.

Written Opinion of the ISA for PCT/US2008/011950 dated Nov. 2, 2009.

Written Opinion of the ISA for PCT/US2011/044212 dated Aug. 7, 2012.

Written Opinion of the ISA for PCT/US2014/011214 dated Feb. 6, 2015.

Written Opinion of the ISA for PCT/US2016/029414 dated Jul. 12, 2016.

International Preliminary Report on Patentability for PCT/US2016/029414 dated Nov. 9, 2017.

\* cited by examiner

TEMPERATURE DEPENDENT CHARGE ALGORITHM

CROSS REFERENCE TO RELATED APPLICATION

This U.S. nonprovisional application is the 35 USC § 371 national phase of PCT application no. PCT/US2016/029414, filed on Apr. 27, 2016, which claims priority to U.S. provisional application No. 62/154,206, filed on Apr. 29, 2015. Both of these documents are hereby incorporated by reference in its entirety.

TECHNICAL FIELD

This disclosure relates to methods for charging rechargeable batteries. Specifically, this disclosure relates to temperature dependent charging methods and simplified charging methods for silver based rechargeable batteries.

BACKGROUND

Rechargeable batteries are known in the art and commonly used, for example, in portable electronic devices (e.g., hearing aids). Although conventional rechargeable batteries are useful, the systems and methods used to recharge the batteries are nevertheless susceptible to improvements that may enhance or improve their service life, shelf life, and/or performance. Therefore, a need exists in the art for the development of an improved apparatus for recharging batteries and a method for charging the same.

Traditional battery charging devices often calculate a charge capacity of a battery undergoing a charging session. The charging devices employ processing devices (e.g., microprocessor) to calculate the charge capacity. Processing devices may increase the cost of the charging device as well as the size of the charging device. Some battery cell types discharge through an upper voltage plateau and a lower voltage plateau. Battery cell types may be charged using a constant current-constant voltage with a maximum charge current and a maximum charge voltage.

SUMMARY

An aspect of the present disclosure provides a method for charging a rechargeable battery. The method includes obtaining, by charging circuitry, an open circuit voltage of the battery prior to a charging session, the charging circuitry is in electrical communication with a power source and the battery. The method also includes initiating, by the charging circuitry, the charging session to charge the battery at a constant charge current-constant charge voltage with power provided form the power source, the charging session corresponding to one of a first charging strategy or a second charging strategy based on the obtained open circuit voltage of the battery. The method also includes obtaining, by the charging circuitry, an ambient temperature measured by a temperature sensor in communication with the charging circuitry, and obtaining, by the charging circuitry, a charge termination time based on the ambient temperature. The method also includes terminating, by the charging circuitry, the charging session when the charge termination time is reached.

Implementations of the disclosure may include one or more of the following optional features. In some implementations, the charging session corresponds to the first charging strategy when the obtained battery open circuit voltage is less than a voltage threshold and the charging session corresponds to the second charging strategy when the obtained battery open circuitry voltage is greater than the voltage threshold. In some examples, when the charging session corresponds to the first charging strategy, the method includes initiating, by the charging circuitry, a timer when the charging session to charge the battery at the constant charge current-constant charge voltage initiates. In these examples, obtaining the charge termination time includes, when a voltage of the battery reaches a predetermined voltage after initiating the charging session: obtaining, by the charging circuitry, the ambient temperature and a polarization time corresponding to a value of the timer from when the charging session initiates until the battery voltage reaches the predetermined voltage; and estimating, by the charging circuitry, the charge termination time as a function of the ambient temperature, the polarization time, the charge current, and the charge voltage. Additionally, the method may include terminating, by the charging circuitry, the charging session if the battery voltage does not reach the predetermined voltage within a polarization time threshold and the battery voltage is less than a termination voltage threshold. In some scenarios, the predetermined voltage corresponds to one of a peak polarization voltage or a predetermined voltage value near the peak polarization voltage. In some examples, after the voltage of the battery reaches the predetermined voltage, the method also includes continuing to charge the battery at the constant charge current-constant charge voltage until the battery voltage reaches a voltage limit corresponding to a maximum battery voltage; decreasing, by the charging circuitry, the charge current at a rate when the battery voltage reaches the voltage limit; and terminating the charging session upon the earlier one of the timer reaching the charge termination time or the charge current falling below a charge current threshold.

In some implementations, when the charging session corresponds to the second charging strategy, the obtaining the charge termination time includes initiating, by the charging circuitry, a timer when the charging session initiates; obtaining the ambient temperature when the timer reaches an initial charging time; and estimating, by the charging circuitry, the charge termination time and an end of the charge current as a function of the ambient temperature, the charge current, and the charge voltage. In some examples, after the timer reaches the initial charging time, the method also includes continuing to charge the battery at the constant charge current-constant charge voltage until the battery voltage reaches a voltage limit corresponding to a maximum battery voltage; decreasing, by the charging circuitry, the charge current at a rate when the battery voltage reaches the voltage limit; and terminating the charging session upon the earlier one of the timer reaching the charge termination time or the charge current falling below the end of the charge current for a current termination period. The method may also optionally include terminating, by the charging circuitry, the charging session if the charge current falls below a charge current threshold within the initial charging time after the timer and the charging session initiate.

In some examples the battery includes a silver-zinc battery type. Additionally or alternatively, the battery may include a single cell or two or more cells in series and the charging circuitry may be implemented upon a silicon chip.

Another aspect of the disclosure provides an apparatus for charging a rechargeable battery that includes a temperature sensor configured to measure ambient temperature and charging circuitry in electrical communication with the temperature sensor, the battery and a power source. The charging circuitry ins configured to initiate a charging session to charge the battery at a constant charge current to a maximum battery voltage with power provided from the power source, obtain the ambient temperature from the temperature sensor, obtain a charge termination time based on the ambient temperature, and terminate the charging session when the charge termination time is reached.

This aspect may include one or more of the following optional features. In some examples, the charging circuitry is further configured to obtain an open circuit voltage of the battery prior to initiating the charging session, determine the battery is indicative of being in a lower voltage plateau prior to initiating the charging session when the open circuit voltage is less than a voltage threshold, obtain the ambient temperature and a polarization time when a voltage of the battery under load reaches a predetermined voltage after initiating the charging session, and estimating the charge termination time as a function of the ambient temperature and the polarization time. In these examples, the polarization time corresponds to a time from when the charging session initiates until the battery voltage reaches the predetermined voltage. Additionally, the charging circuitry may also be configured to continue charging the battery at the constant charge current until the battery voltage reaches the maximum battery voltage after the battery voltage reaches the predetermined voltage, decrease the charge current at a rate when the battery voltage reaches the maximum battery voltage, and terminate the charging session upon the earlier one of the charge termination time or the charge current falling below a charge current threshold. In some scenarios, the predetermined voltage corresponds one of a peak polarization voltage or a predetermined voltage value near the peak polarization voltage.

In some implementations, the charging circuitry is also configured to obtain an open circuit voltage of the battery prior to initiating the charging session, determine the battery is indicative of being in an upper voltage plateau prior to initiating the charging session when the battery open circuit voltage is greater than a voltage threshold, initiate a timer when the charging session initiates, obtain the ambient temperature when the timer reaches an initial charging time, and estimate the charge termination time and an end of charge current as a function of the ambient temperature. In these implementations, the charging circuitry may also be configured to continue charging the battery at the constant charge current until the battery voltage reaches the maximum battery voltage after the timer reaches the initial charging time, decrease the charge current at a rate when the battery voltage reaches the maximum battery voltage, and terminate the charging session upon the earlier one of the timer reaching the charge termination time or the charge current falling below the end of charge current for a current termination period. Additionally or alternatively, the charging circuitry may terminate the charging session if the charge current falls below a charge current threshold within the initial charging time.

The battery may include a single cell or two or more cells in series having a silver-zinc battery type. A silicon chip may implement the charging circuitry and the temperature sensor. Here, the silicon chip may be located in a device powered by the battery or the silicon chip may be located in a charging base. When the silicon chip is located in a charging base, the charging base is configured to electrically connect to the battery and the power source.

In yet another aspect, a charging system provides a rechargeable battery configured to provide power to electrical components of a device, a power source, and a charger including charging circuitry in electrical communication with the power source and the battery when the battery is docked with the charging circuitry. The charging circuitry obtaining an open circuitry voltage of the battery prior to a charging session when the battery is docked with the charging circuitry and initiating the charging session to charge the battery at a constant charge current to a maximum battery voltage with power provided from the power source. The charging session corresponds to one of a first charging strategy or a second charging strategy based on the obtained battery open circuit voltage. The charging circuitry also obtaining an ambient temperature measured by a temperature sensor in communication with the charging circuitry, obtaining a charge termination time based on the ambient temperature, and terminating the charging session when the charge termination time is reached.

In some implementations, the charging circuitry obtains the charge termination time by determining the battery is indicative of being in a lower voltage plateau prior to initiating the charging session when the battery open circuit voltage is less than a voltage threshold; obtaining the ambient temperature and a polarization time when a voltage of the battery under load reaches a predetermined voltage after initiating the charging session, the polarization time corresponding to a time from when the charging session initiates until the battery voltage reaches the predetermined voltage; and estimating the charge termination time as a function of the ambient temperature and the polarization time. In these implementations, the charging circuitry may terminate the charging session by continuing to charge the battery at the constant charge current until the battery voltage reaches the maximum battery voltage after the battery voltage reaches the predetermined voltage, decreasing the charge current at a rate when the battery voltage reaches the maximum battery voltage, and terminating the charging session upon the earlier one of the charge termination time or the charge current falling below a charge current threshold.

Optionally, the charging circuitry may obtain the charge termination time by determining the battery is indicative of being in an upper voltage plateau prior to initiating the charging session when the battery open circuit voltage is greater than a voltage threshold, initiating a timer when the charging session initiates, obtaining the ambient temperature when the timer reaches an initial charging time, and estimating the charge termination time and an end of charge current as a function of the ambient temperature. In these implementations, the charging circuitry may also be configured to terminate the charging session by continuing to charge the battery at the constant charge current until the battery voltage reaches the maximum battery voltage after the timer reaches the initial charging time, decreasing the charge current at a rate when the battery voltage reaches the maximum battery voltage, and terminating the charging session upon the earlier one of the timer reaching the charge termination time or the charge current falling below the end of charge current for a current termination period.

The battery may include a silver-zinc battery type and the battery-powered device may include a hearing aid device. In some examples, the charging circuitry is located within the battery-powered device or a charging base external to the battery-powered device.

DESCRIPTION OF DRAWINGS

The following figures are provided by way of example and are not intended to limit the scope of the invention.

Like reference symbols in the various drawings indicate like elements.

DETAILED DESCRIPTION

Figure 1A:
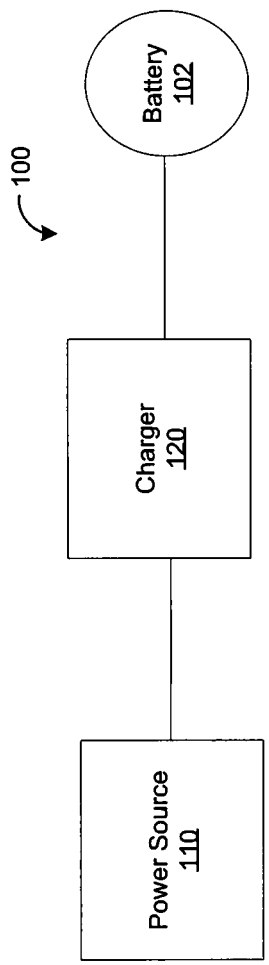
FIGS. 1A and 1B are schematic views of an example system for charging a rechargeable silver-zinc battery.
Figure 1B:
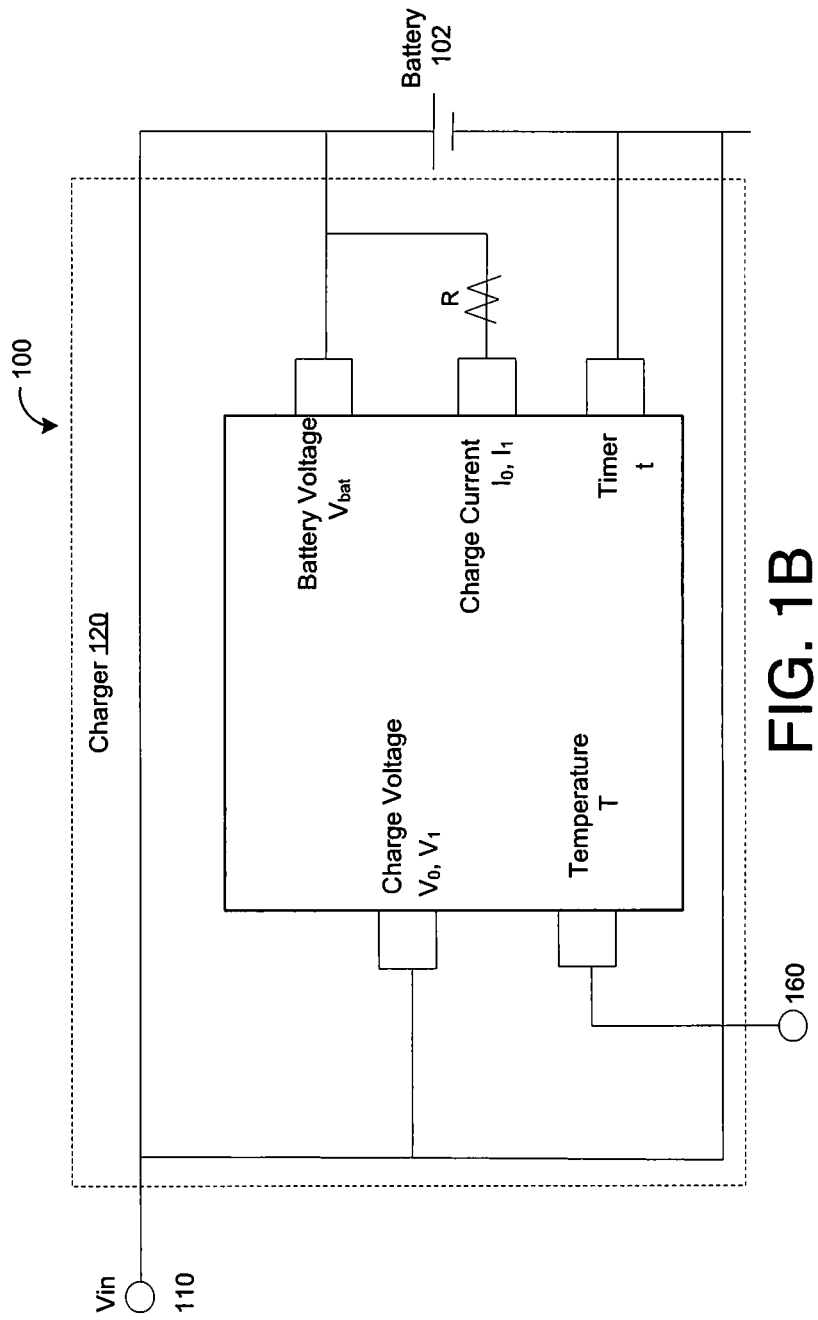

Referring to FIGS. 1A and 1B, in some implementations, a system 100 includes charging circuitry 120 (e.g., charger) in electrical communication with a power source 110 to provide a constant charge current-constant charge voltage (CC-CV) to charge a rechargeable battery 102 (or batteries) when the rechargeable battery is docked with the charging circuitry 120. As used herein, the terms "charging circuitry" and "charger" are used interchangeably. The battery 102 is docked with the charging circuitry 120 when the battery 102 is electrically or wirelessly connected to the charging circuitry 120 to undergo a charging session. In some implementations, the battery 102 includes two or more batteries electrically connected in series with the charging circuitry 120 to undergo a charging session. Accordingly, the use of the term "battery 102" herein may refer to a single battery or multiple batteries connected in series.

In some examples, the battery 102 powers electrical components of a battery-powered device or system. For instance, the battery 102 (or batteries) may power a hearing aid device. In contrast to conventional charging systems that include processing capabilities (e.g., a microprocessor and/or an integrator) to manage charging parameters to charge a battery, a chip implements the example charger 120 and the charger 120 uses timer data (e.g., timer (t)) and temperature data (e.g., ambient temperature (T)) in combination with a discharge voltage over time of the battery 102 to determine the charging CC-CV and a charge termination time ($t_t$) for charging the battery 102. In some implementations, the chip implementing the example charger 120 includes a silicon chip. In some examples, the charging circuitry 120 is located within a small-battery powered device (e.g., hearing aid device) powered by the one or more batteries 102. The small-battery powered device may include electrical contacts for electrically communicating with the power source 110 during a charging session or the small-battery powered device may be configured to wirelessly charge the battery 102 via induction with power received by the power source 110. In other examples, the charging circuitry 120 is located within a charging base (e.g., power source 110) that receives the battery 102 or the battery-powered device housing the battery. In some scenarios, a portion of the charging circuitry 120 is located within the charging base while another portion of the charging circuitry 120 is located within the battery-powered device. Implementing the charging circuitry 120 upon the silicon chip reduces size and manufacturing costs since a microprocessor and/or integrator are omitted from the charging system 100.

In some implementations, the rechargeable battery is a silver-zinc (AgZn) battery; however, the battery may include a lithium ion battery, a nickel metal hydride battery, a rechargeable zinc-air battery, or other rechargeable battery. Implementations herein will refer to the battery 102 as an AgZn battery type. The charger 120 may determine what type of battery is being charged to adjust the charging parameters accordingly.

In some examples, the AgZn battery 102 includes a maximum voltage ($V_{bat\_max}$) equal to about 1.86 V (i.e., 1.7 V to 1.8 V under load). Thus, two AgZn batteries 102 in series includes a $V_{bat\_max}$ equal to about 3.72 V (i.e., 3.4 V to 3.6 V under load). The AgZn battery 102 may power electrical components of a hearing aid device that may include, but are not limited to, a microphone, an audio amplifier, related electrical circuitry, and a loud speaker. The power source 110 may include a wall outlet connected to the charger via a wall source or another device connected to the battery 102. In some examples, the power source 110 includes a charging base powered by an associated battery or some other device. The example charger 120 may sense or obtain charging voltage ($V_0$, $V_1$) and charging current ($I_0$, $I_1$) received from the power source 110 in any suitable manner. For example, one or more resistors R may be used for obtaining charge current flow.

The example charger 120 may include a temperature sensor 160 to monitor ambient temperature (T). During a charging session, a timer (t) may increment from zero when a charging session begins. For example, the value of the timer t may correspond to a polarization time ($t_p$) indicating the time at which a voltage ($V_{bat}$) of the battery 102 reaches $V_{PP}$, wherein $V_{PP}$ is a peak polarization voltage or a predetermined voltage value near the peak polarization voltage (e.g., $V_{PP}$ is from about 50 to about 95 percent of the peak polarization voltage) during the charging session. In some implementations, the $V_{bat}$ corresponds to an open circuit voltage (OCV) of the battery 102 prior to the charging session or other scenarios when the battery 102 is not under load. In other implementations, the $V_{bat}$ corresponds to a voltage of the battery 102 under load. Generally, the value of the $V_{bat}$ under load drops from the value of the OCV. In some examples, the timer t may decrement from a predetermined value during a charging session. For example, the predetermined value may correspond to a charging termination time ($t_t$) at which the charging session ends. The example charger 120 may sense the charging current ($I_0$, $I_1$) thru the battery 102 (e.g., a single battery or two batteries in series) during the charging session.

Figure 2:
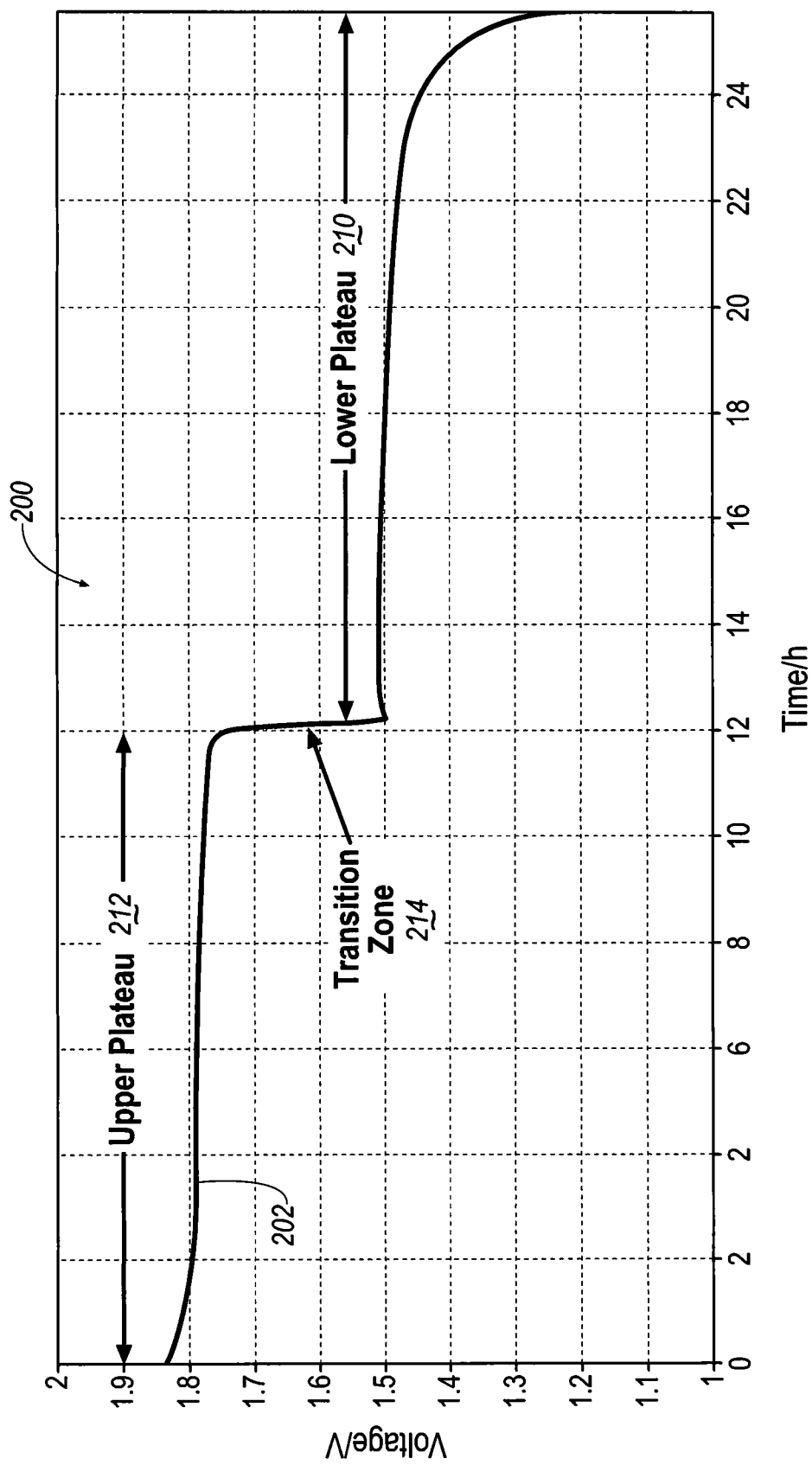
FIG. 2 shows an example plot of a discharge voltage over time for a rechargeable silver-zinc battery.

FIG. 2 shows an example plot 200 of a discharge voltage 202 over time for a rechargeable AgZn battery. The horizontal x-axis denotes time in hours (h) and the vertical y-axis denotes voltage (V). The discharge voltage 202 shows the AgZn battery 102 may discharge in a first zone 210 corresponding to a lower voltage plateau or may discharge in a second zone 212 corresponding to an upper voltage plateau, depending on the state of charge or open circuit voltage of the battery when charging starts. A transition zone 214 corresponds to region between the first and second zones 210, 212, respectively. Accordingly, from a full charge with an open circuit voltage (OCV) of about 1.86 V, the discharge voltage 202 shows the AgZn battery discharging in the second zone 212 for about 12 hours until falling to about 1.5

V and discharging in the first zone 210 from about 12 hours to about 24 hours before depleting.

In some implementations, the charging device 120 executes one of a first or second charging strategy during a charging session to charge the battery 102 according to a CC-CV with a maximum charge current and a maximum charge voltage based upon what zone (e.g., first zone 210 or second zone 212) the battery 102 (e.g., a single battery or two batteries in series) was last discharging in just prior to when the charging session begins. For instance, the first charging strategy is used when the OCV ($V_{bat}$) of the battery 102 prior to charging is less than or equal to a voltage threshold and the second charging strategy is used when the OCV of the battery 102 prior to charging is greater than the voltage threshold. As used herein, the OCV corresponds to the open cell voltage per battery cell, and therefore, when the battery 102 includes two batteries in series, each of the two batteries corresponds to a respective cell. In some examples, the voltage threshold is 1.7 V (e.g., 1.7 V/cell), where values of 1.7 V or less correspond to the battery discharging in the first zone 210 and values greater than 1.7 V correspond to the battery 102 discharging in the second zone 212. The battery 102 may be indicative of being deeply discharged to a state of charge less than 50% when the OCV ($V_{bat}$) of the battery 102 prior to charging is less than the voltage threshold.

In some examples, the OCV of the battery 102 may settle at a settling voltage when the first charging strategy begins. In some examples, the settling voltage is equal to about 1.59 V. The first charging strategy, upon the $V_{bat}$ settling at the settling voltage, initiates the timer (t) and begins charging the battery 102 at an initial charge current ($I_0$) to an initial charge voltage ($V_0$) corresponding to a maximum voltage. In some implementations, $V_0 = V_{PP}$. In the provided examples, the settling voltage=1.59 V, the $I_0$=5.0 microamperes (mA), and the $V_0$=maximum voltage=1.98 V. When the $V_{bat}$ of the battery 102 reaches $V_{PP}$, the first charging strategy continues charging the battery 102 at a charge current ($I_1$)=$I_0$ to a voltage limit ($V_1$)=$V_0$, decreases the $I_1$ by a rate when the $V_{bat}$ reaches the $V_1$, and terminates the charging session after timer t reaches a charging termination time ($t_t$) or the charge current ($I_1$) is less than a charge current threshold ($I_{min}$). In some examples, the $V_{PP}$ is between 1.80 V and 2.20 V (e.g., between 1.96 V and 1.98 V). In other examples, $V_{PP}$ is equal to about 1.90 V.

Figure 3:
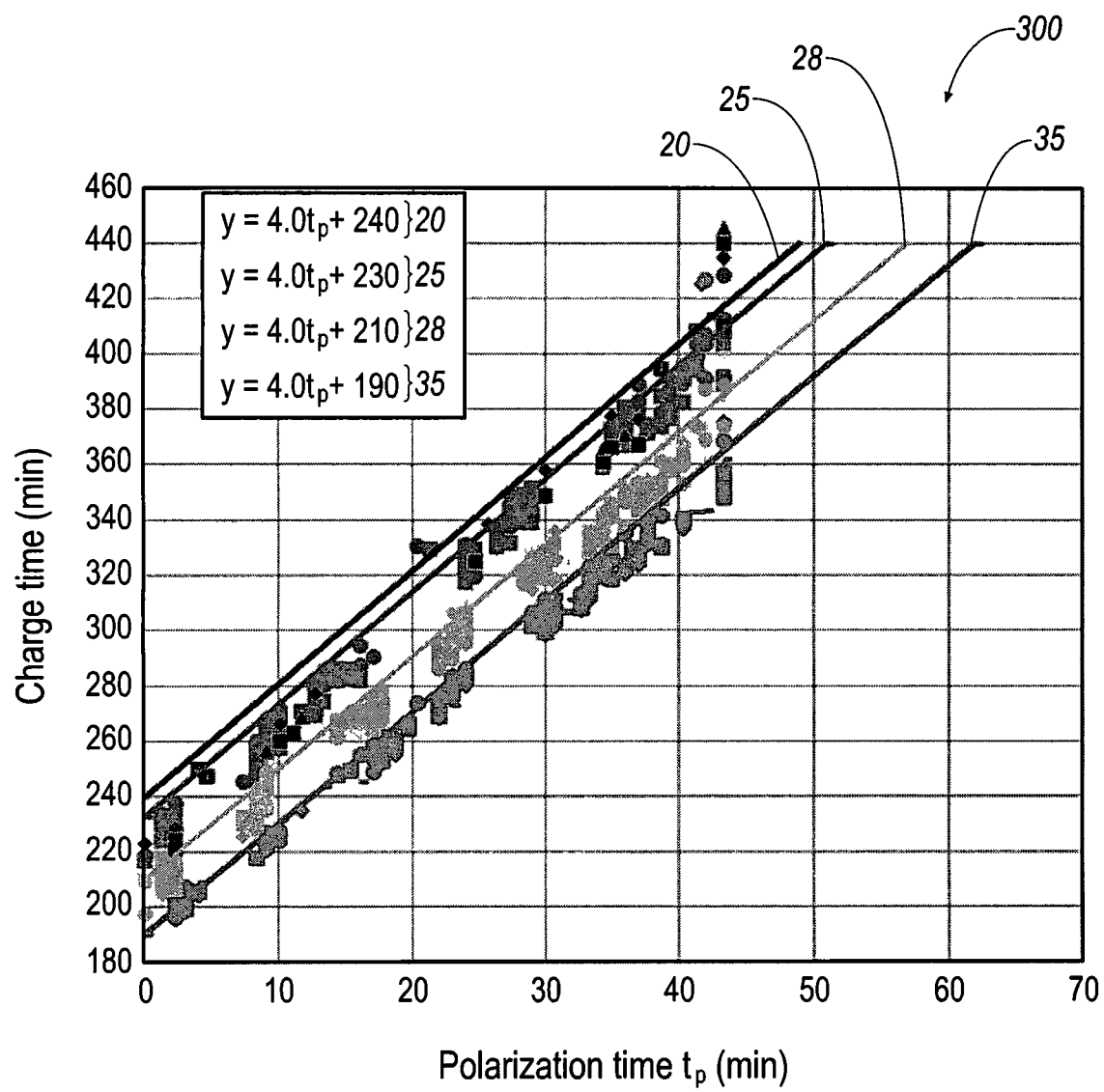
FIG. 3 shows a plot of empirical data for values of charge termination time verses values of polarization time at ambient temperatures of 20° C., 25° C., 28° C. and 35° C.

In some implementations, the charging device 120 estimates the $t_t$ based upon the ambient temperature (T) and a polarization time ($t_p$). The $t_p$ corresponds to a time from when the charging session begins until the $V_{bat}$ reaches the $V_{PP}$. Several implementations use the value of $V_{PP}$=1.90 V for obtaining the $t_p$. Referring to FIG. 3, an exemplary plot 300 shows empirical data for values of $t_t$ verses values of $t_p$ at ambient temperatures of 20° C., 25° C., 28° C. and 35° C. when charging the battery from the first zone 210 at a constant charge current ($I_0$, $I_1$) of 5 mA to a maximum voltage ($V_0$, $V_1$) of 1.98 V. The horizontal x-axis denotes the $t_p$ in minutes (min) and the vertical y-axis denotes the $t_t$ in minutes (min). The plot 300 provides linear lines 20, 25, 28, 35 corresponding to respective ones of the ambient temperatures 20° C., 25° C., 28° C., 35° C. The linear lines 20, 25, 28, 35 provide a linear relationship where the charge termination time, $t_t$, for a given temperature, T, and polarization time, $t_p$, can be expressed as follows:

$$t_t = m\ t_p + b \quad [1]$$

where m is a temperature independent constant and b is a function of temperature. Additionally, m and b are functions of the charge current ($I_0$, $I_1$) and charge voltage ($V_0$, $V_1$). Table 1 provides a charge termination time ($t_t$) using Eq. [1] for a range of ambient temperatures (T) from 10° C. to 35° C. for $I_0$=$I_1$=5.0 mA and $V_0$=$V_1$=1.98 V.

TABLE 1

| T (° C.)> | $t_t$ (min) |
|---|---|
| 32 | 4.0 $t_p$ + 190 |
| 28 | 4.0 $t_p$ + 210 |
| 24 | 4.0 $t_p$ + 230 |
| 20 | 4.0 $t_p$ + 250 |
| 16 | 4.0 $t_p$ + 270 |
| 12 | 4.0 $t_p$ + 290 |

Figure 4:
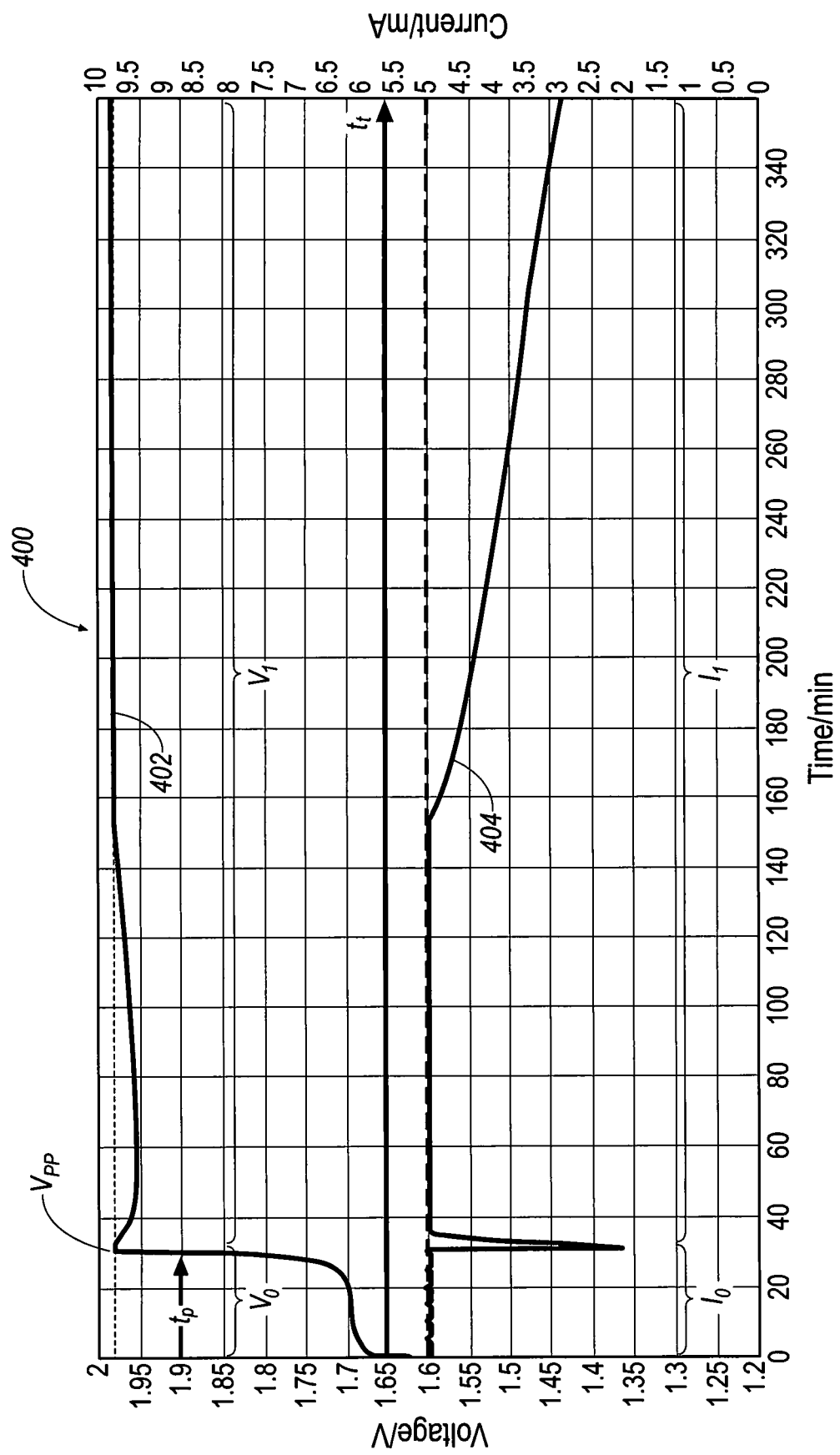
FIG. 4 is an example plot providing a battery voltage and charge current over time when a rechargeable silver-zinc hearing aid battery is charged according to one implementation (e.g., a first charging strategy) of the present invention.

Referring to FIG. 4, when charging begins and the timer (t) initiates, the first charging strategy obtains the ambient temperature (T) and the polarization time $t_p$ when the $V_{bat}$ reaches $V_{PP}$ (e.g., 1.90 V) and selects the charge termination time ($t_t$) based on the obtained T and $t_p$. In some implementations, the first charging strategy references a look-up table to select the value of $t_t$ using the obtained values for T and $t_p$. In some examples, the first charging strategy look-up table is constructed using Eq. [1] and Table 1 for a range of values of $t_p$ at selected increments and a range of values of T between each of the selected increments. Table 2 provides an example first charge strategy look-up table for a range of values of $t_p$ at 5 min increments from 5 min to 60 min.

TABLE 2

| Time to reach $t_p$ (min) | T (° C.)> | $I_1$ (mA) | $V_1$ (V) | $t_t$ (min) |
|---|---|---|---|---|
| 5 | 32 | 5 | 1.98 | 210 |
| | 28 | 5 | 1.98 | 230 |
| | 24 | 5 | 1.98 | 250 |
| | 20 | 5 | 1.98 | 270 |
| | 16 | 5 | 1.98 | 290 |
| | 12 | 5 | 1.98 | 310 |
| 10 | 32 | 5 | 1.98 | 230 |
| | 28 | 5 | 1.98 | 250 |
| | 24 | 5 | 1.98 | 270 |
| | 20 | 5 | 1.98 | 290 |
| | 16 | 5 | 1.98 | 310 |
| | 12 | 5 | 1.98 | 330 |
| 15 thru 50 | 32 | 5 | 1.98 | 250-390 |
| | 28 | 5 | 1.98 | 270-410 |
| | 24 | 5 | 1.98 | 290-430 |
| | 20 | 5 | 1.98 | 310-450 |
| | 16 | 5 | 1.98 | 330-470 |
| | 12 | 5 | 1.98 | 350-490 |
| 55 | 32 | 5 | 1.98 | 410 |
| | 28 | 5 | 1.98 | 430 |
| | 24 | 5 | 1.98 | 450 |
| | 20 | 5 | 1.98 | 470 |
| | 16 | 5 | 1.98 | 490 |
| | 12 | 5 | 1.98 | 510 |
| 60 | 32 | 5 | 1.98 | 430 |
| | 28 | 5 | 1.98 | 450 |
| | 24 | 5 | 1.98 | 470 |
| | 20 | 5 | 1.98 | 490 |
| | 16 | 5 | 1.98 | 510 |
| | 12 | 5 | 1.98 | 530 |

By referencing a first charge strategy look-up table (e.g., Table 2), the first charging strategy may estimate the value of the charge termination time $t_t$ without the need to apply Eq. [1] for calculating $t_t$. Different first charge strategy look-up tables may be constructed to increase accuracy of values estimated and/or to increase the rate at which the values are obtained. For example, the first charging strategy may decrease the increment value between the polarization times $t_p$ in the look-up table to increase the accuracy in estimating the value of the charge termination time $t_t$. In a non-limiting example using Table 2, if the $t_p$ is less than 5 min and the T is greater than 24° C. and less than or equal to 28° C., then the value for $t_t$ obtained from Table 2 is equal to about 250 min. Accordingly, upon the $V_{bat}$ reaching $V_{PP}$, the charger 120 will continue to charge the battery using $I_1$=5.0 mA to the maximum voltage of $V_1$=1.98 V and will terminate charging when the timer t reaches the $t_t$=250 min or the $I_1$ becomes less than the $I_{min}$. In some examples, the $I_{min}$ is equal to 0.5 mA.

FIG. 4 provides an example plot 400 showing a battery voltage ($V_{bat}$) 402 (e.g., $V_{bat}$ per cell when two cells are in series) and a battery current ($I_0$, $I_1$) 404 when the first charging strategy is used to charge the battery from the first zone 210. The horizontal x-axis denotes time (min), the left-side vertical y-axis denotes voltage (V) and the right-side vertical y-axis denotes current (mA). The first charging strategy initiates the timer t and begins charging the battery 102 at 0 min from the OCV settling voltage of about 1.59 V upon being deeply discharged. The charger charges the battery 102 at $I_0$=5.0 mA to $V_0$=1.98 V. The polarization time $t_p$ is equal to about 30 min when the $V_{bat}$ 402 reaches the $V_{PP}$ of about 1.90 V. Using the $t_p$ and the T, the first charging strategy may obtain the charge termination time $t_t$ from the first charging strategy look-up table (e.g., Table 2) and continue to charge the battery 102 at $I_1$=5.0 mA to $V_1$=1.98 V. For example, a $t_t$ equal to about 360 min is obtained from Table 2 for the $t_p$ equal to about 30 min when the T is greater than 28° C. and less than or equal to 32° C. Referring to the example plot 400, the $V_{bat}$ 402 reaches the maximum voltage of about 1.98 V at about 155 min and the $I_1$ 404 begins to decrease at a rate from 5.0 mA. The battery 102 continues charging until the timer t reaches the $t_t$ at 360 min. However, charging will terminate before the $t_t$ if the $I_1$ 404 were to fall below the battery current threshold ($I_{min}$) equal to 0.5 mA.

Referring back to FIG. 2, in some implementations, the second charging strategy is used when the OCV of the battery 102 prior to charging is greater than the voltage threshold (e.g., $V_{bat}$>1.7 V). The second charging strategy initiates the timer t and begins charging of the battery at an initial charge current ($I_0$) to an initial voltage ($V_0$) corresponding to a maximum battery voltage. In some examples, charging terminates if the charge current falls below the battery charge current threshold ($I_{min}$) within an initial charging time. In the example provided, the $I_0$ is equal to 5.0 mA, the $V_0$ is equal to 1.98 V, the is equal to 0.5 mA and the initial charging time is equal to 10 min. When the timer t reaches the initial charging time, the charger 120 obtains the ambient temperature (T) and continues charging the battery at $I_1$=5.0 mA to $V_1$=1.98 V. The charger 120 may use the T to obtain a value corresponding to an end of battery charge current ($I_{bat\_end}$) and the charge termination time $t_t$ from a second charge strategy look-up table. The charger 120 will continue charging the battery (or batteries in series) until $I_1$ falls below the $I_{bat\_end}$ for a current termination period or the timer t reaches the $t_t$. In some examples, the current termination period is equal to 60 seconds. Table 3 provides an example second charging strategy look-up table for obtaining values of $I_{bat\_end}$ and $t_t$ as a function of T, $I_1$ and $V_1$.

TABLE 3

| Timer Start (min) | T (° C.)> | $I_1$ (mA) | $V_1$ (v) | $I_{bat\_end}$ (mA) | $t_t$ (min) |
| --- | --- | --- | --- | --- | --- |
| 10 | 35 | 5 | 1.98 | 4.7 | 180 |
| | 33 | 5 | 1.98 | 4.5 | 180 |
| | 31 | 5 | 1.98 | 4.3 | 180 |

TABLE 3-continued

| Timer Start (min) | T (° C.)> | $I_1$ (mA) | $V_1$ (v) | $I_{bat\_end}$ (mA) | $t_t$ (min) |
| --- | --- | --- | --- | --- | --- |
| | 29 | 5 | 1.98 | 4.1 | 190 |
| | 27 | 5 | 1.98 | 3.8 | 190 |
| | 25 | 5 | 1.98 | 3.6 | 200 |
| | 23 | 5 | 1.98 | 3.4 | 210 |
| | 21 | 5 | 1.98 | 3.1 | 220 |
| | 19 | 5 | 1.98 | 2.6 | 230 |
| | 17 | 5 | 1.98 | 2.4 | 230 |
| | 15 | 5 | 1.98 | 2.1 | 240 |
| | 13 | 5 | 1.98 | 1.9 | 250 |
| | 10 | 5 | 1.98 | 1.5 | 260 |

Figure 5:
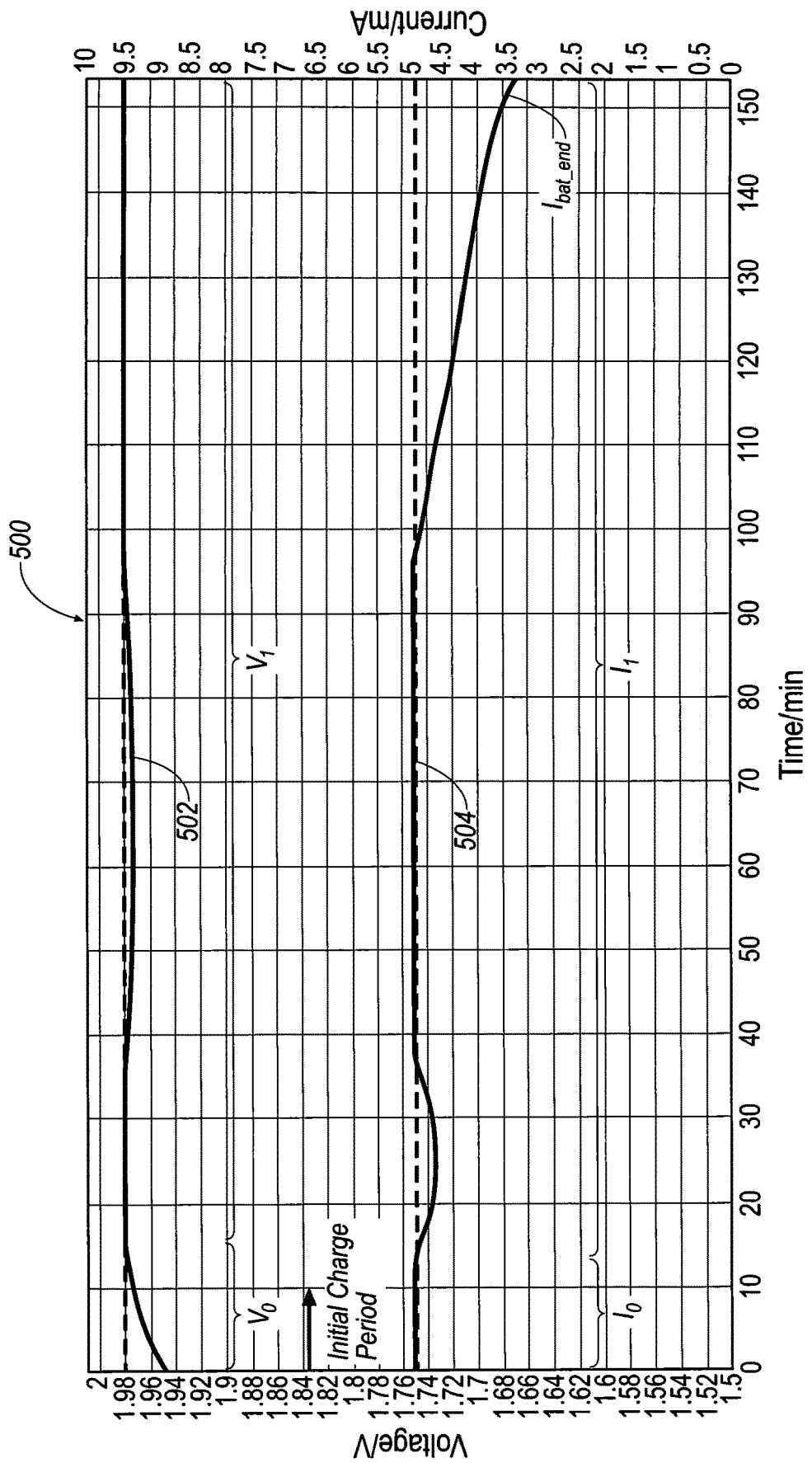
FIG. 5 is an example plot providing a battery voltage and charge current over time when a rechargeable silver-zinc hearing aid battery is charged according to another implementation (e.g., a second charging strategy) of the present invention.

FIG. 5 is an example plot 500 providing battery voltage ($V_{bat}$) over time 502 and a battery charge current ($I_0$, $I_1$) over time 504 when the second charging strategy is used to charge the battery 102 from the second zone 212. The horizontal x-axis denotes time (min), the left-side vertical y-axis denotes voltage (V) and the right-side vertical y-axis denotes current (mA). At 0 min, the second charging strategy initiates the timer t and begins charging the battery at $I_0$=5.0 mA to $V_0$=1.98 V. When the timer t reaches the initial charging time of 10 min, the charger 120 obtains the value for T from the temperature sensor 160 and continues charging the battery at $I_1$=5.0 mA to $V_1$=1.98 V. The charger 120 also refers to a second charging strategy look-up table (e.g., Table 3) to obtain the value for $I_{bat\_end}$ and the value for $t_t$ based upon the values for T, $I_1$ and $V_1$. For example, $I_{end}$=3.6 mA and $t_t$=200 min for a T greater than 25° C. and less than or equal to 27° C. when the timer t reaches the initial charge period (e.g., 10 min). At or around 97 min, the $V_1$ reaches the maximum voltage of about 1.98 V and the $I_1$ 504 begins to decrease at a rate. In the example plot 500 of FIG. 5, charging terminates when $I_1$ 504 falls below $I_{bat\_end}$ (e.g., 3.6 mA) for the charge termination period (e.g., 60 seconds) continuously. However, charging will also terminate if the timer t were to reach the $t_t$ (e.g., 200 min) before $I_1$ 504 falls below $I_{bat\_end}$ for the charge termination period.

Figure 6:
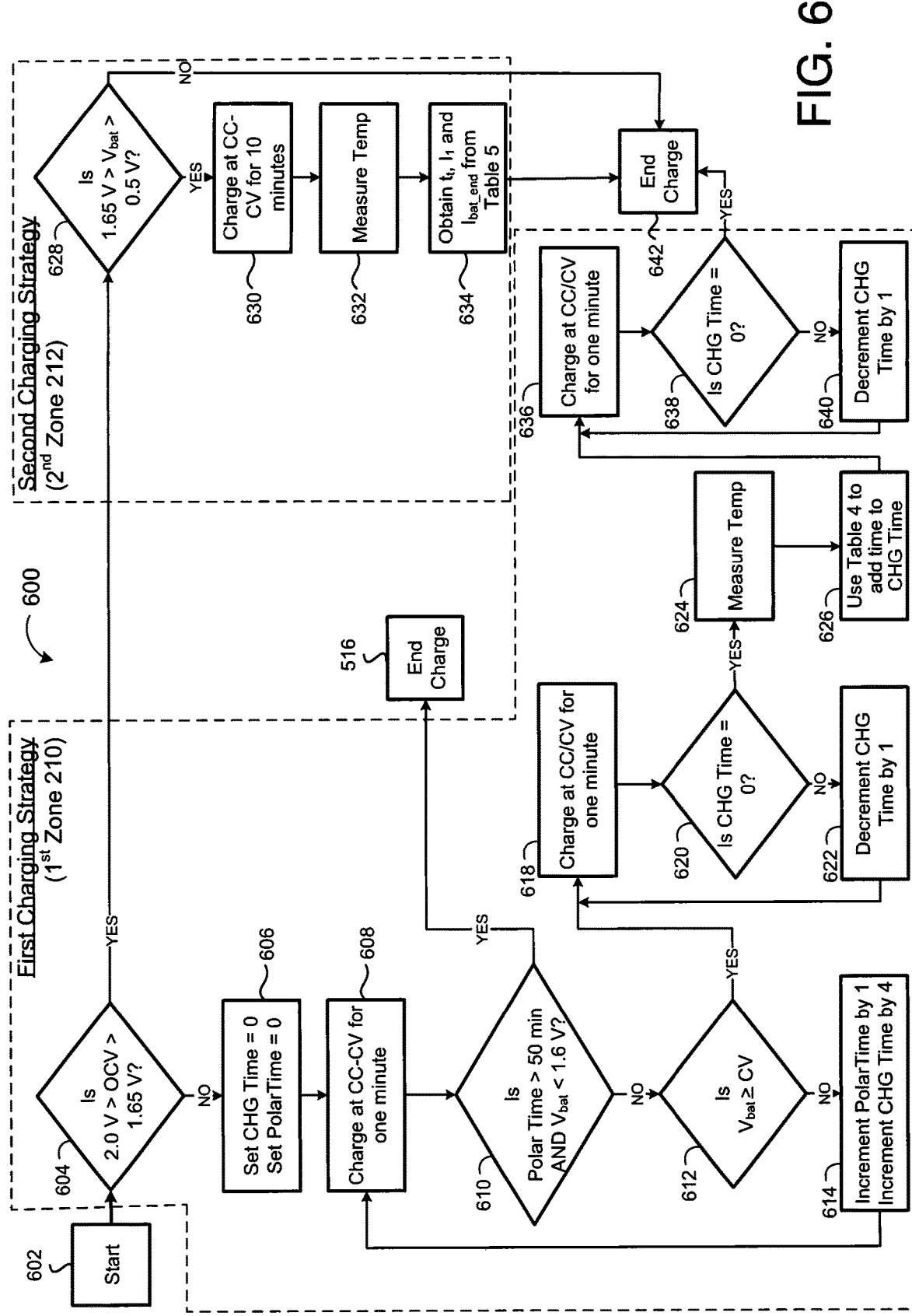
FIGS. 6-8 provide flowcharts for methods of charging a battery according to implementations of the present invention.
Figure 7:
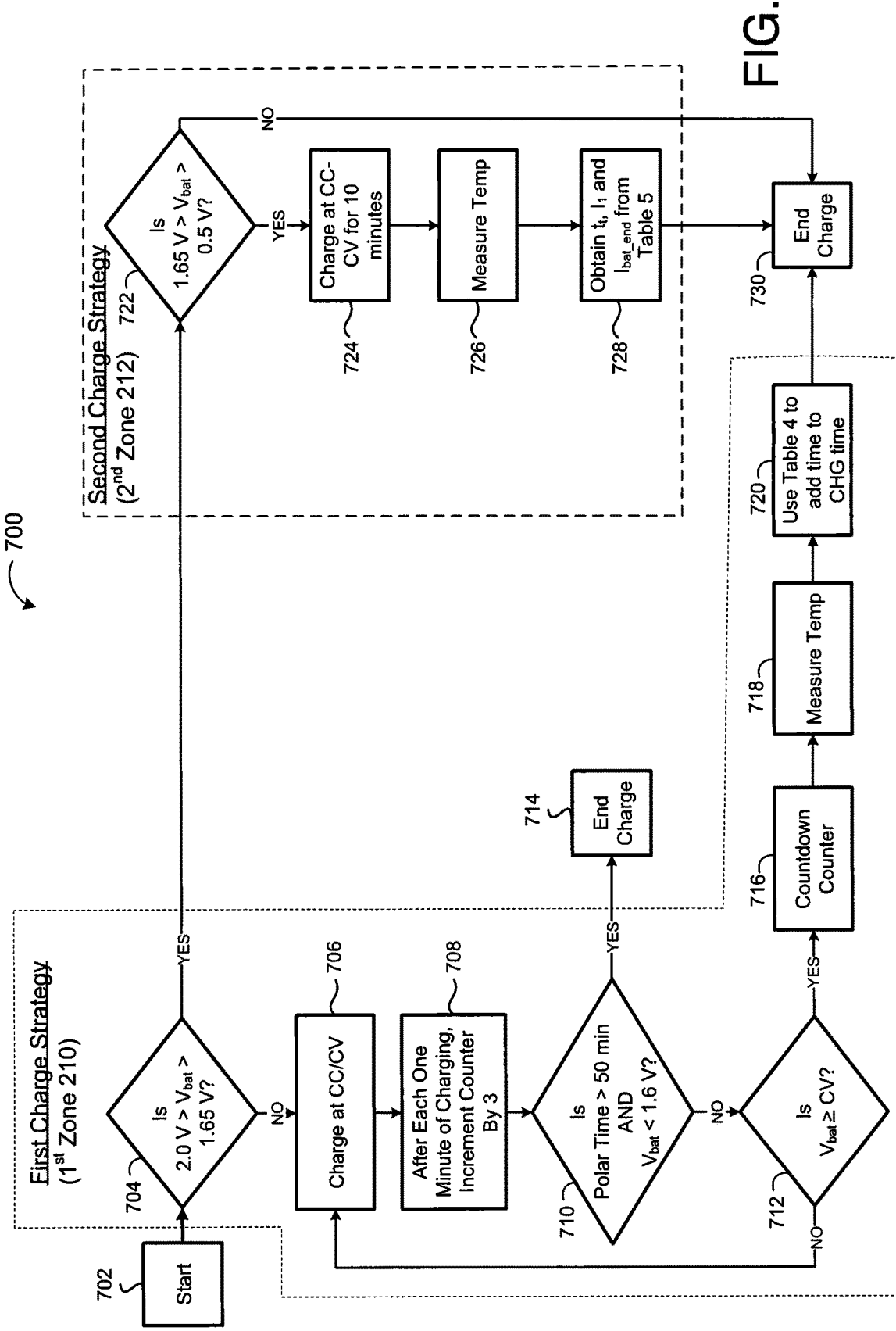
Figure 8:
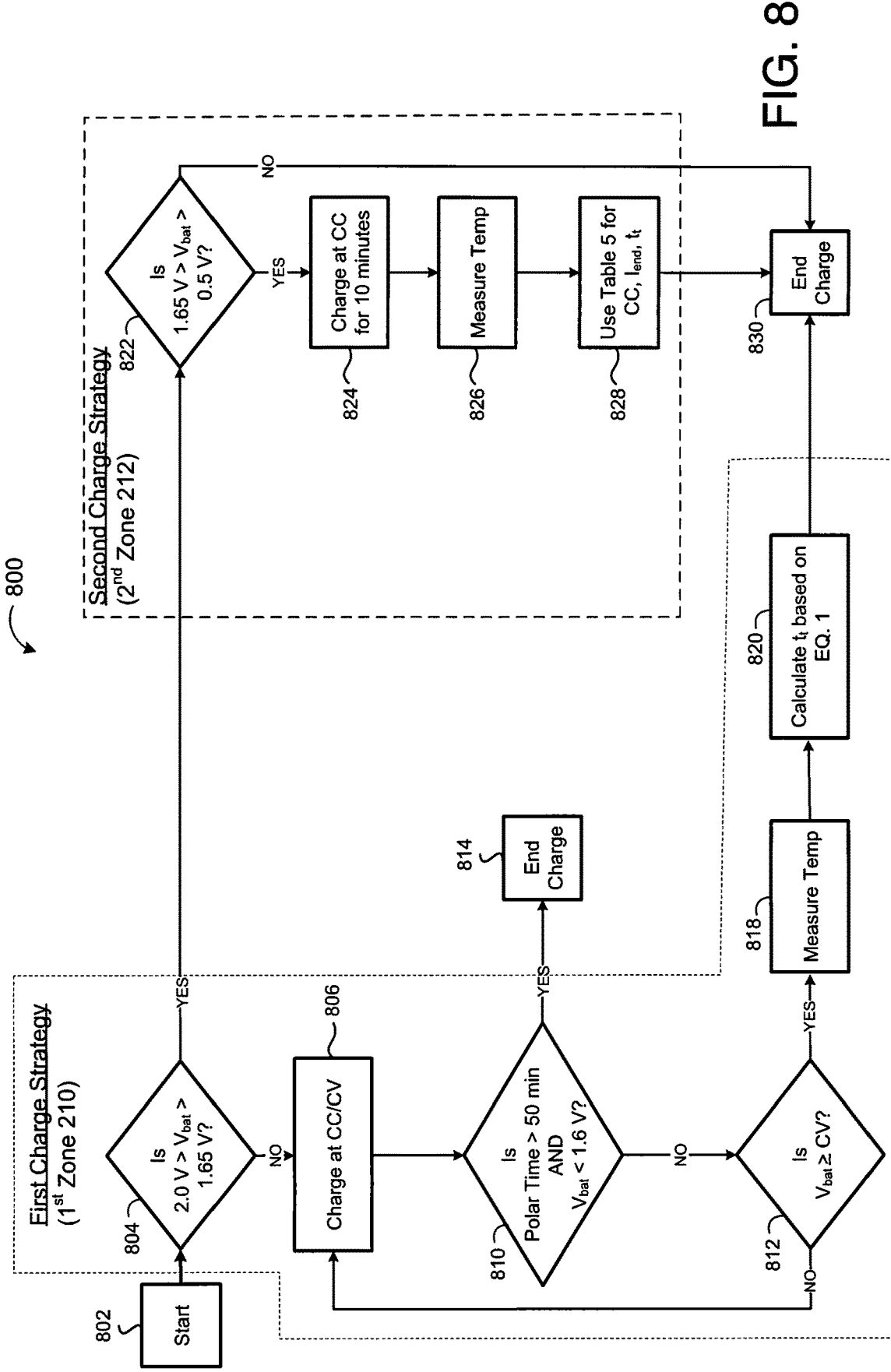

FIGS. 6-8 provide flowcharts 600, 700, 800 for methods of charging a battery 102 that has a discharge voltage in one of the first zone 210 or the second zone 212 of FIG. 2. The methods provided by the flowcharts 600, 700, 800 equally apply to the charging of two or more batteries 102 in series. Referring to FIG. 6, the flowchart 600 starts at block 602, and at decision block 604, determines whether or not the OCV of the battery 102 is less than 2.00 V and greater than 1.65 V. Here, the value of 1.65 V corresponds to the voltage threshold and 2.00 V corresponds to the maximum OCV of the battery 102. If the OCV is greater than 1.65 V and less than 2.00 V (e.g., decision block 604 is "YES"), the battery 102 is indicative of being discharged in the second zone 212 and the battery 102 charges by the second charging strategy. If, however, the OCV is not greater than 1.65 or not less than 2.00 V (e.g., decision block 604 is "NO"), the battery 102 is indicative of being discharged in the first zone 210 and the battery 102 charges by the first charging strategy.

When the battery 102 charges by the first charging strategy, the charger 120 sets a charge time (CHG Time) and a polarization time (PolarTime) both to zero at block 606, and at block 608, the charger 120 charges the battery 102 at a constant current-constant voltage (CC-CV) for one minute. The CC may correspond to $I_0$=5.0 mA and the CV may correspond to $V_0$=1.98V. At decision block 610, the flowchart 600 determines whether or not the PolarTime is greater than 50 min and the $V_{bat}$ is less than 1.60 V. Here, the $V_{bat}$ corresponds to the voltage of the battery 102 under load. If decision block 610 is a "YES", the charging session ends at block 616 because the PolarTime to reach the VPP exceeds 50 min and the $V_{bat}$ is not increasing during the charging session. If, however, decision block 610 is a "NO", decision block 612 determines whether or not the $V_{bat}$ is greater than or equal to the CV (e.g., 1.98V). The $V_{bat}$ being greater than or equal to the CV corresponds to the $V_{PP}$ being reached. The flowchart 600 increments the PolarTime by one and the CHG Time by 4 at block 614 and repeats blocks 608-612 when the $V_{bat}$ is determined to be less than the CV (e.g., decision block 612 is "NO"). The flowchart 600 proceeds to block 618 if the $V_{bat}$ is greater than or equal to the CV (e.g., decision block 612 is "YES").

At block 618, the charger 120 charges the battery 102 at a CC-CV for one minute and proceeds to decision block 620 to determine whether or not the CHG Time is equal to zero. The CC may correspond to $I_1$=5.0 mA and the CV may correspond to $V_1$=1.98V. When the CHG Time is not equal to zero (e.g., decision block 620 is "NO"), the CHG Time decrements by one at block 622, and the flowchart 600 repeats blocks 618 and 620. However, when the CHG Time is equal to zero (e.g., decision block 620 is "YES"), the charger 120 measures the ambient temperature T at block 624 and uses a first charge strategy look-up table to determine an amount of time to add to the CHG Time. Table 4 below provides an example first charging strategy look-up table including values for CHG Time based on the measured ambient temperature T. Table 4 may be constructed in the same manner as Table 1 based on Eq. [1].

TABLE 4

| T (° C.) | CHG Time (min) |
|---|---|
| T > 32 | 190 |
| 32 > T > 28 | 210 |
| 28 > T > 24 | 230 |
| 24 > T > 20 | 250 |
| 20 > T > 16 | 270 |
| 16 > T > 10 | 290 |

Upon obtaining the CHG Time from Table 4, the charger charges the battery at the CC-CV for one minute at block 636, and at decision block 638, determines if the CHG Time is equal to zero. The charging session ends at block 642 when the CHG Time is equal to zero (e.g., decision block 638 is "YES"). If the CHG Time is not equal to zero (e.g., decision block 638 is "NO"), the charger 120 decrements the CHG Time by 1 at block 640, and the flowchart 600 repeats blocks 636 and 638.

When the battery 102 charges by the second charging strategy (e.g., decision block 604 is "YES"), the flowchart 600 determines whether or not the battery voltage ($V_{bat}$) under load is less than 1.65 V and greater than 0.50 V at decision block 628. A properly functioning battery that is correctly connected to a voltage source will experience a slight voltage drop from its open circuit voltage (OCV) when the battery is under load. In other words, the battery 102 is expected to experience a slight voltage drop from the open circuit voltage (OCV) obtained at decision block 604 upon applying a load to the battery 102. However, for a condition when the battery 102 (e.g., AgZn battery) experiences a large voltage drop from its OCV when the battery is under load, the battery 102 may be indicative of possessing an internal short or otherwise may not be suitable for recharging. For example, if the battery 102 has a voltage ($V_{bat}$) under load that is less than 1.65 V and also less than 0.50 V (e.g., decision block 628 is "NO"), the battery is indicative of not being suitable for recharging and the charging session ends at block 642. If, however, decision block 628 is "YES", the charger 120, at block 630, charges the battery 102 at a CC-CV for an initial charge period (e.g., 10 minutes). The CC may correspond to an $I_0$=5.0 mA and the CV may correspond to a $V_0$=1.98V. After the initial charge period, the charger 120 measures the ambient temperature (T) at block 632. The charger 120 may obtain the T from the temperature sensor 160. At block 634, the charger 120 uses the T to obtain values for a charge termination time ($t_t$), a charge current ($I_1$), and an end of battery charge current ($I_{bat\_end}$) from a second charging strategy look-up table (Table 5). The charger 120 continues charging the battery at the obtained $I_1$ until $I_{bat}$ falls below the obtained $I_{bat\_end}$ for a current termination period or the timer t reaches the $t_t$. The current termination period may be equal to 60 seconds. Thus, the charging session ends at block 642 upon the earlier one of $I_{bat} < I_{bat\_end}$ for the current termination period or t=$t_t$. Table 5 below provides an example second charging strategy look-up table including values for $t_t$, $I_1$, and $I_{bat\_end}$ based on T. Table 5 may be constructed based on Table 3.

TABLE 5

| T (° C.) | $t_t$ (min) | $I_1$ (mA) | $I_{bat\_end}$ (mA) |
|---|---|---|---|
| T > 35 | 180 | 6 | 4.7 |
| 35 > T > 33 | 180 | 6 | 4.5 |
| 33 > T > 31 | 180 | 6 | 4.3 |
| 31 > T > 29 | 190 | 5 | 4.1 |
| 29 > T > 27 | 190 | 5 | 3.8 |
| 27 > T > 25 | 200 | 5 | 3.6 |
| 25 > T > 23 | 210 | 5 | 3.4 |
| 23 > T > 21 | 220 | 5 | 3.1 |
| 21 > T > 19 | 230 | 5 | 2.6 |
| 19 > T > 17 | 230 | 5 | 2.3 |
| 17 > T > 15 | 240 | 5 | 2.1 |
| 15 > T > 13 | 250 | 5 | 1.9 |
| 13 > T > 10 | 260 | 5 | 1.5 |

Referring to FIG. 7, the flowchart 700 starts at block 702, and at decision block 704, determines whether or not the OCV of the battery 102 is less than 2.00 V and greater than 1.65 V. Here, the value of 1.65 V corresponds to the voltage threshold and 2.00 V corresponds to the maximum OCV of the battery 102. If the OCV is greater than 1.65 V and less than 2.00 V (e.g., decision block 704 is "YES"), the battery 102 is indicative of being discharged in the second zone 212 and the battery 102 charges by the second charging strategy. If, however, the OCV is not greater than 1.65 V or not less than 2.00 V (e.g., decision block 704 is "NO"), the battery 102 is indicative of being discharged in the first zone 210 and the battery 102 charges by the first charging strategy.

When the battery 102 charges by the first charging strategy, the charger charges the battery 102 at a constant CC-CV at block 706, and after each one minute of charging, the timer t increments by 3 at block 708. The CC may correspond to an $I_0$=5.0 mA and the CV may correspond to a $V_0$=1.98 V. At decision block 710, the flowchart 700 determines whether or not the PolarTime is greater than 50 min and the $V_{bat}$ is less than 1.60 V. Here, the $V_{bat}$ corresponds to the voltage of the battery 102 under load. If decision block 710 is a "YES", the charging session ends at block 716 because the PolarTime to reach the $V_{PP}$ exceeds 50 min and the $V_{bat}$ is not increasing during the charging session. If, however, decision block 710 is a "NO", decision block 712 determines whether or not the $V_{bat}$ is greater than or equal to the CV (e.g., 1.98 V). The $V_{bat}$ being greater than or equal to the CV corresponds to the $V_{PP}$ being reached. The flowchart 700 repeats blocks 706-712 when the $V_{bat}$ is determined to be less than the CV (e.g., decision block 712 is "NO"). If the $V_{bat}$ is greater than or equal to the CV, a countdown timer initiates at block 716 and the charger 120 measures the ambient temperature (T) at block 718. The charger 120 uses the obtained T to obtain an amount of time (e.g., CHG Time) to add to the counter from the first charge strategy look-up table. The look-up table may correspond to Table 4. The charging session ends at block 730 when the countdown timer reaches zero (e.g., charge termination time is reached) or the $I_{bat}$ falls below $I_{min}$.

When the battery 102 charges by the second charging strategy (e.g., decision block 704 is "YES"), the flowchart 700 determines whether or not the $V_{bat}$ under load is less than 1.65 V and greater than 0.50 V at decision block 722. A properly functioning battery that is correctly connected to a voltage source will experience a slight voltage drop from its open circuit voltage (OCV) when the battery is under load. In other words, the battery 102 is expected to experience a slight voltage drop from the open circuit voltage (OCV) obtained at decision block 704 upon applying a load to the battery 102. However, for a condition when the battery 102 (e.g., AgZn battery) experiences a large voltage drop from its OCV when the battery is under load, the battery 102 may be indicative of possessing an internal short or otherwise may not be suitable for recharging. For example, if the battery 102 has a voltage ($V_{bat}$) under load that is less than 1.65 V and also less than 0.50 V (e.g., decision block 722 is "NO"), the battery is indicative of not being suitable for recharging and the charging session ends at block 730. If, however, decision block 722 is "YES", the charger 120, at block 724, charges the battery 102 at a CC-CV for an initial charge period (e.g., 10 minutes). The CC may correspond to an $I_0$=5.0 mA and the CV may correspond to a $V_0$=1.98V. After the initial charge period, the charger 120 measures the ambient temperature (T) at block 726. The charger 120 may obtain the T from the temperature sensor 160. At block 728, the charger 120 uses the T to obtain values for $t_t$, $I_1$, $I_{bat\_end}$ from a second charging strategy look-up table (Table 5). The charger 120 continues charging the battery 102 at the obtained $I_1$ until $I_{bat}$ falls below the obtained $I_{bat\_end}$ for a current termination period or the timer t reaches the $t_t$. The current termination period may be equal to 60 seconds. Thus, the charging session ends at block 730 upon the earlier one of $I_{bat}<I_{bat\_end}$ for the current termination period or $t=t_t$.

Referring to FIG. 8, the flowchart 800 starts at block 802, and at decision block 804, determines whether or not the OCV of the battery 102 is less than 2.00 V and greater than 1.65 V. Here, the value of 1.65 V corresponds to the voltage threshold and 2.00 V corresponds to the maximum OCV of the battery 102. If the OCV is greater than 1.65 V and less than 2.00 V (e.g., decision block 804 is "YES"), the battery 102 is indicative of being discharged in the second zone 212 and the battery 102 charges by the second charging strategy. If, however, the OCV is not greater than 1.65 V or not less than 2.00 V (e.g., decision block 804 is "NO"), the battery 102 is indicative of being discharged in the first zone 210 and the battery 102 charges by the first charging strategy.

When the battery 102 charges by the first charging strategy, the charger charges the battery 102 at a constant CC-CV at block 806. The CC may correspond to an $I_0$=5.0 mA and the CV may correspond to a $V_0$=1.98V. At decision block 810, the flowchart 800 determines whether or not the PolarTime is greater than 50 min and the $V_{bat}$ is less than 1.60 V.

Here, $V_{bat}$ corresponds to the voltage of the battery 102 under load. If decision block 810 is a "YES", the charging session ends at block 816 because the PolarTime to reach the $V_{PP}$ exceeds 50 min and the $V_{bat}$ is not increasing during the charging session. If, however, decision block 810 is a "NO", decision block 812 determines whether or not the $V_{bat}$ is greater than or equal to the CV (e.g., 1.98V). The $V_{bat}$ being greater than or equal to the CV corresponds to the $V_{PP}$ being reached. The flowchart 800 repeats blocks 806-812 when the $V_{bat}$ is determined to be less than the CV (e.g., decision block 812 is "NO"). If the $V_{bat}$ is greater than or equal to the CV, the charger 120 measures the ambient temperature (T) at block 818. The charger 120 uses the obtained T to calculate the charge termination time ($t_t$) using Eq. [1]. The charging session ends at block 830 when the timer t reaches $t_t$ or the $I_{bat}$ falls below $I_{min}$.

When the battery 102 charges by the second charging strategy (e.g., decision block 804 is "YES"), the flowchart 800 determines whether or not the $V_{bat}$ under load is less than 1.65 V and greater than 0.50 V at decision block 822. A properly functioning battery that is correctly connected to a voltage source will experience a slight voltage drop from its open circuit voltage (OCV) when the battery is under load. In other words, the battery 102 is expected to experience a slight voltage drop from the open circuit voltage (OCV) obtained at decision block 804 upon applying a load to the battery 102. However, for a condition when the battery 102 (e.g., AgZn battery) experiences a large voltage drop from its OCV when the battery is under load, the battery 102 may be indicative of possessing an internal short or otherwise may not be suitable for recharging. For example, if the battery 102 has a voltage ($V_{bat}$) under load that is less than 1.65 V and also less than 0.50 V (e.g., decision block 822 is "NO"), the battery is indicative of not being suitable for recharging and the charging session ends at block 830. If, however, decision block 822 is "YES", the charger 120, at block 824, charges the battery 102 at a CC-CV for an initial charge period (e.g., 10 minutes). The CC may correspond to an $I_0$=5.0 mA and the CV may correspond to a $V_0$=1.98V. After the initial charge period, the charger 120 measures the ambient temperature (T) at block 826. The charger 120 may obtain the T from the temperature sensor 160. At block 828, the charger 120 uses the T to obtain values for $t_t$, $I_1$, $I_{bat\_end}$ from a second charging strategy look-up table (Table 5). The charger 120 continues charging the battery 102 at the obtained $I_1$ until $I_{bat}$ falls below the obtained $I_{bat\_end}$ for a current termination period or the timer t reaches the $t_t$. The current termination period may be equal to 60 seconds. Thus, the charging session ends at block 830 upon the earlier one of $I_{bat}<I_{bat\_end}$ for the current termination period or $t=t_t$.

Implementations have been described. Nevertheless, it will be understood that various modifications may be made without departing from the spirit and scope of the disclosure. Accordingly, other implementations are within the scope of the following claims.

What is claimed is:

1. A method for charging a rechargeable battery comprising:
obtaining, by charging circuitry, an open circuit voltage of the battery prior to a charging session, the charging circuitry in electrical communication with a power source and the battery;
initiating, by the charging circuitry, the charging session to charge the battery at a constant charge current-constant charge voltage with power provided from the power source, the charging session corresponding to one of a first charging strategy or a second charging strategy based on the obtained open circuit voltage of the battery;

obtaining, by the charging circuitry, an ambient temperature (T) measured by a temperature sensor in communication with the charging circuitry;

obtaining, by the charging circuitry, a charge termination time ($t_t$) based on the ambient temperature (T); and terminating, by the charging circuitry, the charging session when the charge termination time ($t_t$) is reached; and when the charging session corresponds to the first charging strategy:

initiating, by the charging circuitry, a timer (t) when the charging session to charge the battery at the constant charge current-constant charge voltage initiates; and when a voltage ($V_{bat}$) of the battery reaches a predetermined voltage after initiating the charging session:

obtaining, by the charging circuitry, the ambient temperature (T) and a polarization time ($t_p$), the polarization time ($t_p$) corresponding to a value of the timer (t) from when the charging session initiates until the battery voltage ($V_{bat}$) reaches the predetermined voltage; and estimating, by the charging circuitry, the charge termination time ($t_t$) as a function of the ambient temperature (T), the polarization time ($t_p$), the charge current, and the charge voltage.

2. The method of claim 1, wherein the charging session corresponds to the first charging strategy when the obtained battery open circuit voltage is less than a voltage threshold and the charging session corresponds to the second charging strategy when the obtained battery open circuit voltage is greater than the voltage threshold.

3. The method of claim 1, further comprising terminating, by the charging circuitry, the charging session if the battery voltage ($V_{bat}$) does not reach the predetermined voltage within a polarization time threshold and the battery voltage ($V_{bat}$) is less than a termination voltage threshold.

4. The method of claim 1, wherein the predetermined voltage corresponds to one of a peak polarization voltage ($V_{PP}$) or a predetermined voltage value near the peak polarization voltage ($V_{PP}$).

5. The method of claim 1, further comprising, after the voltage ($V_{bat}$) of the battery reaches the predetermined voltage:

continuing to charge the battery at the constant charge current-constant charge voltage until the battery voltage ($V_{bat}$) reaches a voltage limit, the voltage limit corresponding to a maximum battery voltage ($V_{bat\_max}$);

decreasing, by the charging circuitry, the charge current at a rate when the battery voltage ($V_{bat}$) reaches the voltage limit; and terminating the charging session upon the earlier one of the timer (t) reaching the charge termination time ($t_t$) or the charge current falling below a charge current threshold.

6. The method of claim 1, wherein obtaining the charge termination time ($t_t$) when the charging session corresponds to the second charging strategy comprises:

initiating, by the charging circuitry, a timer (t) when the charging session initiates;

obtaining the ambient temperature (T) when the timer (t) reaches an initial charging time; and estimating, by the charging circuitry, the charge termination time ($t_t$) and an end of charge current as a function of the ambient temperature (T), the charge current, and the charge voltage.

7. The method of claim 6, further comprising, after the timer (t) reaches the initial charging time:

continuing to charge the battery at the constant charge current-constant charge voltage until the battery voltage ($V_{bat}$) reaches a voltage limit, the voltage limit corresponding to a maximum battery voltage ($V_{bat\_max}$);

decreasing, by the charging circuitry, the charge current at a rate when the battery voltage ($V_{bat}$) reaches the voltage limit; and terminating the charging session upon the earlier one of the timer (t) reaching the charge termination time ($t_t$) or the charge current falling below the end of charge current for a current termination period.

8. The method of claim 6, further comprising, after the timer (t) and the charging session initiate, terminating, by the charging circuitry, the charging session if the charge current falls below a charge current threshold within the initial charging time.

9. The method of claim 1, wherein the battery comprises a silver-zinc battery type.

10. The method of claim 1, wherein the battery comprises a single cell or two or more cells in series, and wherein the charging circuitry is implemented upon a silicon chip.

11. An apparatus for charging a rechargeable battery comprising:

a temperature sensor configured to measure ambient temperature (T); and charging circuitry in electrical communication with the temperature sensor, the battery, and a power source, the charging circuitry configured to:

initiate a charging session to charge the battery at a constant charge current to a maximum battery voltage ($V_{bat\_max}$) with power provided from the power source;

obtain the ambient temperature (T) from the temperature sensor;

obtain a charge termination time ($t_t$) based on the ambient temperature (T); and terminate the charging session when the charge termination time ($t_t$) is reached; and wherein, according to a first charging strategy, the charging circuitry is further configured to:

obtain an open circuit voltage of the battery prior to initiating the charging session;

determine the battery is indicative of being in a lower voltage plateau prior to initiating the charging session when the battery open circuit voltage is less than a voltage threshold;

obtain the ambient temperature (T) and a polarization time ($t_p$) when a voltage ($V_{bat}$) of the battery under load reaches a predetermined voltage after initiating the charging session, the polarization time ($t_p$) corresponding to a time from when the charging session initiates until the battery voltage ($V_{bat}$) reaches the predetermined voltage; and estimate the charge termination time ($t_t$) as a function of the ambient temperature (T) and the polarization time ($t_p$).

12. The apparatus of claim 11, wherein the charging circuitry is further configured to:

after the battery voltage ($V_{bat}$) reaches the predetermined voltage, continue charging the battery at the constant charge current until the battery voltage ($V_{bat}$) reaches the maximum battery voltage ($V_{bat\_max}$);

decrease the charge current at a rate when the battery voltage ($V_{bat}$) reaches the maximum battery voltage ($V_{bat\_max}$); and terminate the charging session upon the earlier one of the charge termination time ($t_t$) or the charge current falling below a charge current threshold.

13. The apparatus of claim 11, wherein the predetermined voltage corresponds to one of a peak polarization voltage ($V_{PP}$) or a predetermined voltage value near the peak polarization voltage ($V_{PP}$).

14. The apparatus of claim 11, wherein, according to a second charging strategy, the charging circuitry is further configured to:

obtain an open circuit voltage of the battery prior to initiating the charging session;

determine the battery is indicative of being in an upper voltage plateau prior (210) to initiating the charging session when the battery open circuit voltage is greater than a voltage threshold;

initiate a timer (t) when the charging session initiates;

obtain the ambient temperature (T) when the timer (t) reaches an initial charging time; and estimate the charge termination time ($t_t$) and an end of charge current as a function of the ambient temperature (T).

15. The apparatus of claim 14, wherein the charging circuitry is further configured to:

after the timer (t) reaches the initial charging time, continue charging the battery at the constant charge current until the battery voltage ($V_{bat}$) reaches the maximum battery voltage ($V_{bat\_max}$);

decrease the charge current at a rate when the battery voltage ($V_{bat}$) reaches the maximum battery voltage ($V_{bat\_max}$); and terminate the charging session upon the earlier one of the timer (t) reaching the charge termination time ($t_t$) or the charge current falling below the end of charge current for a current termination period.

16. The apparatus of claim 14, wherein the charging circuitry is further configured to terminate the charging session if the charge current falls below a charge current threshold within the initial charging time.

17. The apparatus of claim 11, wherein the battery comprises a single cell or two or more cells in series having a silver-zinc battery type.

18. The apparatus of claim 11, further comprising a silicon chip implementing the charging circuitry and the temperature sensor.

19. The apparatus of claim 18, wherein the silicon chip is located in a device powered by the battery.

20. The apparatus of claim 18, wherein the silicon chip is located in a charging base, the charging base configured to electrically connect to the battery and the power source.

21. A charging system comprising:

a rechargeable battery configured to provide power to electrical components of a device;

a power source; and a charger comprising charging circuitry in electrical communication with the power source and the battery when the battery is docked with the charging circuitry, the charging circuitry:

obtaining an open circuit voltage of the battery prior to a charging session when the battery is docked with the charging circuitry;

initiating the charging session to charge the battery at a constant charge current to a maximum battery voltage ($V_{bat\_max}$) with power provided from the power source, the charging session corresponding to one of a first charging strategy or a second charging strategy based on the obtained battery open circuit voltage;

obtaining an ambient temperature (T) measured by a temperature sensor in communication with the charging circuitry;

obtaining a charge termination time ($t_t$) based on the ambient temperature (T); and terminating the charging session when the charge termination time ($t_t$) is reached; and wherein the charging circuitry obtains the charge termination time ($t_t$) according to the first charging strategy by:

determining the battery is indicative of being in a lower voltage plateau prior to initiating the charging session when the battery open circuit voltage is less than a voltage threshold;

obtaining the ambient temperature (T) and a polarization time ($t_p$) when a voltage ($V_{bat}$) of the battery under load reaches a predetermined voltage after initiating the charging session, the polarization time ($t_p$) corresponding to a time from when the charging session initiates until the battery voltage ($V_{bat}$) reaches the predetermined voltage; and estimating the charge termination time ($t_t$) as a function of the ambient temperature (T) and the polarization time ($t_p$).

22. The system of claim 21, wherein the charging circuitry terminates the charging session by:

after the battery voltage ($V_{bat}$) reaches the predetermined voltage, continuing to charge the battery at the constant charge current until the battery voltage ($V_{bat}$) reaches the maximum battery voltage ($V_{bat\_max}$);

decreasing the charge current at a rate when the battery voltage ($V_{bat}$) reaches the maximum battery voltage ($V_{bat\_max}$); and terminating the charging session upon the earlier one of the charge termination time ($t_t$) or the charge current falling below a charge current threshold.

23. The system of claim 21, wherein the charging circuitry obtains the charge termination time ($t_t$) according to the second charging strategy by:

determining the battery is indicative of being in an upper voltage plateau prior to initiating the charging session when the battery open circuit voltage is greater than a voltage threshold;

initiating a timer (t) when the charging session initiates;

obtaining the ambient temperature (T) when the timer (t) reaches an initial charging time; and estimating the charge termination time ($t_t$) and an end of charge current as a function of the ambient temperature (T).

24. The system of claim 23, wherein the charging circuitry terminates the charging session by:

after the timer (t) reaches the initial charging time, continuing to charge the battery at the constant charge current until the battery voltage ($V_{bat}$) reaches the maximum battery voltage ($V_{bat\_max}$);

decreasing the charge current at a rate when the battery voltage ($V_{bat}$) reaches the maximum battery voltage ($V_{bat\_max}$); and terminating the charging session upon the earlier one of the timer (t) reaching the charge termination time ($t_t$) or the charge current falling below the end of charge current for a current termination period.

25. The system of claim 21, wherein the battery comprises a silver-zinc battery type and the battery-powered device comprises a hearing aid device.

26. The system of claim 21, wherein the charging circuitry is located within the battery-powered device or a charging base external to the battery-powered device.

* * * * *